United States Patent
Brown et al.

(10) Patent No.: US 10,415,475 B2
(45) Date of Patent: Sep. 17, 2019

(54) GEARBOX OIL COOLING ASSEMBLY

(71) Applicant: Sikorsky Aircraft Corporation, Stratford, CT (US)

(72) Inventors: Daniel Vincent Brown, Hamden, CT (US); Thomas L. Tully, Jr., Oxford, CT (US); Yuriy Gmirya, Woodbridge, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/325,963

(22) PCT Filed: May 26, 2015

(86) PCT No.: PCT/US2015/032385
§ 371 (c)(1),
(2) Date: Feb. 7, 2017

(87) PCT Pub. No.: WO2016/018498
PCT Pub. Date: Feb. 4, 2016

(65) Prior Publication Data
US 2017/0167383 A1     Jun. 15, 2017

Related U.S. Application Data

(60) Provisional application No. 62/031,440, filed on Jul. 31, 2014.

(51) Int. Cl.
*B60H 3/00*     (2006.01)
*F02C 7/14*     (2006.01)
(Continued)

(52) U.S. Cl.
CPC .............. *F02C 7/14* (2013.01); *B64D 33/08* (2013.01); *F02C 7/32* (2013.01); *F04D 17/16* (2013.01);
(Continued)

(58) Field of Classification Search
CPC ......... F05D 2220/329; F05D 2250/311; F05D 2260/213; F02C 7/14; F02C 7/36;
(Continued)

(56) References Cited

U.S. PATENT DOCUMENTS 3,736,812 A    6/1973   Wellauer
4,414,861 A    11/1983   Witt et al.
(Continued)

FOREIGN PATENT DOCUMENTS

DE    102010025270 A1    12/2011
DE    102012022024 A1    5/2014
(Continued)

OTHER PUBLICATIONS

International Search Report and Written Opinion issued by the International Searching Authority dated Nov. 2, 2015 in related PCT Application No. PCT/US2015/032385, 9 pages.
(Continued)

*Primary Examiner* — Davis D Hwu
(74) *Attorney, Agent, or Firm* — Cantor Colburn LLP

(57) ABSTRACT

A gearbox oil cooling assembly for a gearbox driving a drive shaft having a drive shaft coupling. The assembly includes a heat exchanger to receive and cool an oil from the gearbox and having an inlet. Also included is an impeller axially disposed between the heat exchanger and the drive shaft coupling, wherein the impeller is operatively coupled to, and rotated by, the drive shaft operatively coupled to the drive shaft coupling. Further included is an exhaust duct operatively coupled to the heat exchanger and disposed radially outwardly around the impeller and defining an airflow pathway through which air passes through the inlet, the impeller and through the exhaust duct according to the rotation of the impeller to cool the oil in the heat exchanger.

20 Claims, 6 Drawing Sheets

(51) Int. Cl.

| | | |
|---|---|---|
| *F04D 17/16* | (2006.01) | |
| *F04D 25/02* | (2006.01) | |
| *F02C 7/32* | (2006.01) | |
| *F04D 25/08* | (2006.01) | |
| *F04D 29/28* | (2006.01) | |
| *F04D 29/42* | (2006.01) | |
| *F16H 57/025* | (2012.01) | |
| *F16H 57/04* | (2010.01) | |
| *F28D 7/08* | (2006.01) | |
| *F28D 7/14* | (2006.01) | |
| *B64D 33/08* | (2006.01) | |
| *B64C 27/12* | (2006.01) | |
| *F02C 7/36* | (2006.01) | |
| *F16H 57/02* | (2012.01) | |
| *F28D 21/00* | (2006.01) | |

(52) U.S. Cl.
CPC .............. *F04D 25/02* (2013.01); *F04D 25/08* (2013.01); *F04D 29/28* (2013.01); *F04D 29/4206* (2013.01); *F16H 57/025* (2013.01); *F16H 57/0417* (2013.01); *F28D 7/08* (2013.01); *F28D 7/14* (2013.01); *B64C 27/12* (2013.01); *F02C 7/36* (2013.01); *F05D 2220/329* (2013.01); *F05D 2250/311* (2013.01); *F05D 2260/213* (2013.01); *F05D 2260/98* (2013.01); *F16H 2057/02026* (2013.01); *F28D 2021/0021* (2013.01); *Y02T 50/676* (2013.01)

(58) Field of Classification Search
CPC .......... F02C 7/047; B64C 27/12; F04D 17/16; F04D 25/08; F04D 29/28; F04D 29/4206; F16H 57/025; F16H 57/0417; F28D 7/08; F28D 7/14; F28D 2021/0021
USPC .......................................... 165/44
See application file for complete search history.

(56) References Cited

U.S. PATENT DOCUMENTS

| | | | |
|---|---|---|---|
| 4,459,944 A * | 7/1984 | Kirchweger | B60R 13/0838 |
| | | | 123/195 C |
| 4,999,994 A | 3/1991 | Rued et al. | |
| 5,203,832 A | 4/1993 | Beatenbough et al. | |
| 6,282,881 B1 | 9/2001 | Beutin et al. | |
| 6,397,759 B1 * | 6/2002 | Hubert | B61O 5/00 |
| | | | 105/140 |
| 7,137,590 B2 | 11/2006 | Thierry et al. | |
| 7,343,894 B2 | 3/2008 | Leon | |
| 7,412,831 B2 | 8/2008 | Ullyott | |
| 7,454,894 B2 | 11/2008 | Larkin et al. | |
| 7,654,087 B2 | 2/2010 | Ullyott | |
| 7,690,598 B1 * | 4/2010 | Plattner | B64D 13/02 |
| | | | 244/129.1 |
| 8,161,726 B2 | 4/2012 | Schwarz | |
| 8,196,707 B2 | 6/2012 | Kardos | |
| 8,678,750 B2 | 3/2014 | Seitz | |
| 2005/0115770 A1 | 6/2005 | Sandrart et al. | |
| 2005/0150204 A1 * | 7/2005 | Stretton | F02C 7/047 |
| | | | 60/39.83 |
| 2013/0071232 A1 | 3/2013 | Taneja et al. | |
| 2014/0116654 A1 | 5/2014 | McGlaun et al. | |

FOREIGN PATENT DOCUMENTS

| | | |
|---|---|---|
| EP | 2712805 A1 | 4/2014 |
| GB | 2185551 A | 7/1987 |
| JP | 3-9198 A | 1/1991 |
| KR | 20100109717 A | 10/2010 |

OTHER PUBLICATIONS

European Search Report for EP Application No. 15827866.3 dated Feb. 20, 2018; 19 pages.

* cited by examiner

GEARBOX OIL COOLING ASSEMBLY

CROSS-REFERENCE TO RELATED APPLICATIONS

The present application is a 371 National Stage of International Application No. PCT/US2015/032385, filed on May 26, 2015, which claims priority to U.S. Provisional Application No. 62/031,440, filed on Jul. 31, 2014, the contents of which are incorporated by reference herein in their entirety.

FEDERAL RESEARCH STATEMENT

This invention was made with Government support under Contract No. N00019-06-C-0081 with the United States Navy. The Government has certain rights in the invention.

BACKGROUND OF THE INVENTION

The embodiments herein relate to aircrafts and, more particularly, a gearbox oil cooling assembly disposed on aircrafts.

Gearboxes that generate high levels of heat during operation often require an actively cooled, external heat exchanger to dissipate the heat. Various challenges exist relating to packaging all of the necessary heat dissipating components into a compact envelope while maintaining an efficient and reliable system. A rotary-wing aircraft is an example of an application in which the above-described challenges persist. For example, some rotary-wing aircrafts employ shaft-driven power to impellers through belts, pulleys, and belt-tensioners in order to rotate the impellers. Typically, external oil hoses facilitate transfer of the hot and cooled oil between the gearbox and a heat exchanger. An airflow is facilitated with the impeller and used to cool the heat exchanger, but the heated exhaust air is typically exhausted internally relative to the aircraft and in the vicinity of the gearbox, thereby undesirably leading to operation of the gearbox at an elevated temperature. Furthermore, spinning of the impeller often requires the use of shaft-driven power through belts, pulleys, and belt-tensioners, which increases complexity, thereby leading to potential reliability issues.

BRIEF DESCRIPTION OF THE INVENTION

According to one embodiment, a gearbox oil cooling assembly for a gearbox driving a drive shaft having a drive shaft coupling. The assembly includes a heat exchanger to receive and cool an oil from the gearbox and having an inlet. Also included is an impeller axially disposed between the heat exchanger and the drive shaft coupling, wherein the impeller is operatively coupled to, and rotated by, the drive shaft operatively coupled to the drive shaft coupling. Further included is an exhaust duct operatively coupled to the heat exchanger and disposed radially outwardly around the impeller and defining an airflow pathway through which air passes through the inlet, the impeller and through the exhaust duct according to the rotation of the impeller to cool the oil in the heat exchanger.

According to another embodiment, a gearbox oil cooling assembly for a gearbox driving a drive shaft having a drive shaft coupling. The assembly includes a heat exchanger operatively coupled to the gearbox. Also included is a plurality of tubes disposed at an internal location relative to the gearbox and the heat exchanger, the plurality of tubes comprising a first tube configured to route an oil to the heat exchanger for cooling therein and a second tube configured to return the oil to the gearbox. Further included is an impeller axially disposed between the heat exchanger and the drive shaft coupling, wherein the impeller is operatively coupled to, and rotated by, the drive shaft operatively coupled to the drive shaft coupling. Yet further included is an exhaust duct operatively coupled to the heat exchanger and disposed radially outwardly around the impeller, wherein the impeller, the heat exchanger, and the exhaust duct are concentrically positioned about a central axis of the drive shaft, wherein at least a portion of each of the drive shaft coupling, the impeller, the exhaust duct, the heat exchanger, and the gearbox are disposed in an axially stacked arrangement, wherein the exhaust duct defines an airflow pathway through which air passes through an inlet, the impeller and through the exhaust duct according to the rotation of the impeller to cool the oil in the heat exchanger.

In addition to one or more of the features described above, or as an alternative, further embodiments may include that the drive shaft and the impeller are rotated about a central axis, wherein the heat exchanger is concentrically oriented about the central axis.

In addition to one or more of the features described above, or as an alternative, further embodiments may include that the oil is routed to the heat exchanger within a first tube and the oil is returned to the gearbox within a second tube.

In addition to one or more of the features described above, or as an alternative, further embodiments may include that the first tube and the second tube are disposed at an internal location relative to the gearbox and the heat exchanger.

In addition to one or more of the features described above, or as an alternative, further embodiments may include a gearbox housing, wherein the heat exchanger is directly coupled to the gearbox housing.

In addition to one or more of the features described above, or as an alternative, further embodiments may include that the exhaust duct is directly coupled to the heat exchanger.

In addition to one or more of the features described above, or as an alternative, further embodiments may include that the exhaust duct circumferentially surrounds the impeller and includes a flow path outlet configured to directly exhaust an airflow to the atmosphere.

In addition to one or more of the features described above, or as an alternative, further embodiments may include that the gearbox oil cooling assembly is disposed on a helicopter and the flow path outlet of the exhaust duct is positioned proximate a fairing of the helicopter.

In addition to one or more of the features described above, or as an alternative, further embodiments may include that the impeller, the heat exchanger, and the exhaust duct are concentrically positioned about the drive shaft.

In addition to one or more of the features described above, or as an alternative, further embodiments may include a portion of the gearbox concentrically positioned about a central axis of the drive shaft.

In addition to one or more of the features described above, or as an alternative, further embodiments may include that the heat exchanger includes at least one air inlet configured to receive an airflow in a radial direction, wherein the airflow is routed axially through the heat exchanger to the exhaust duct.

In addition to one or more of the features described above, or as an alternative, further embodiments may include that at least a portion of each of the drive shaft coupling, the impeller, the exhaust duct, the heat exchanger and the gearbox are disposed in an axially stacked arrangement.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
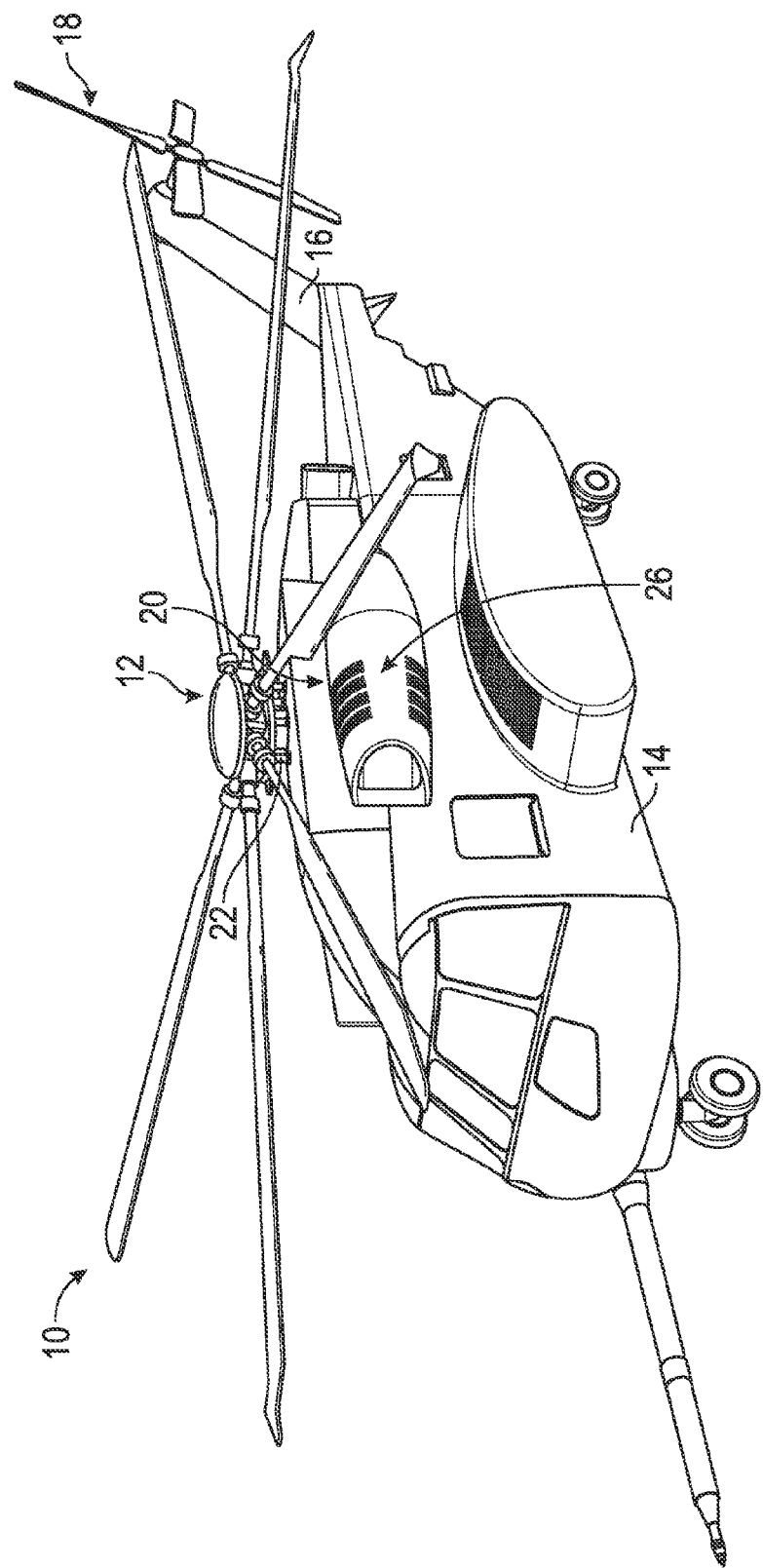
FIG. 1 is a perspective view of a rotary-wing aircraft including a gearbox oil cooling assembly therein.
Figure 2:
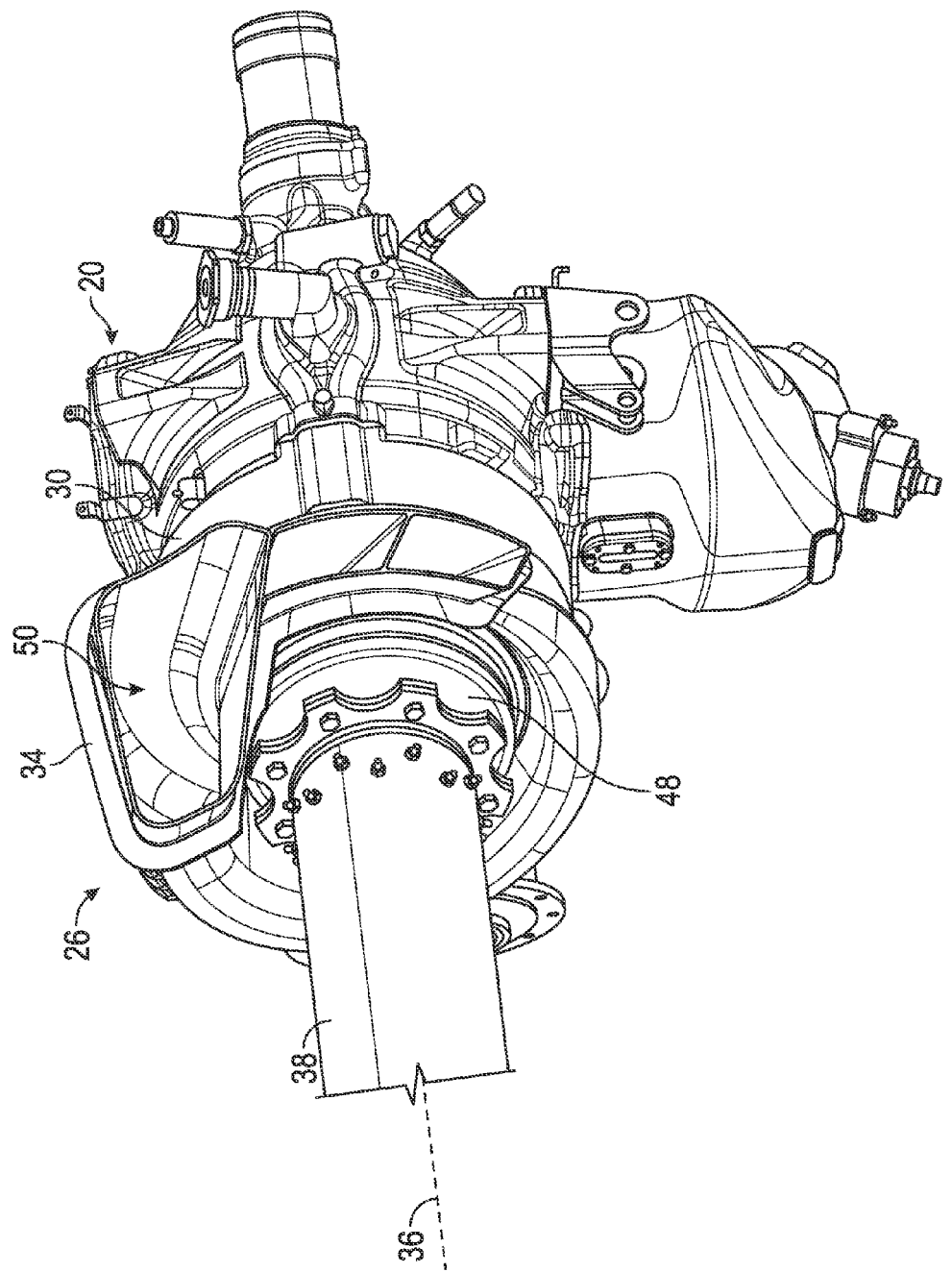
FIG. 2 is a perspective view of a gearbox and a gearbox oil cooling assembly in an assembled condition.
Figure 3:
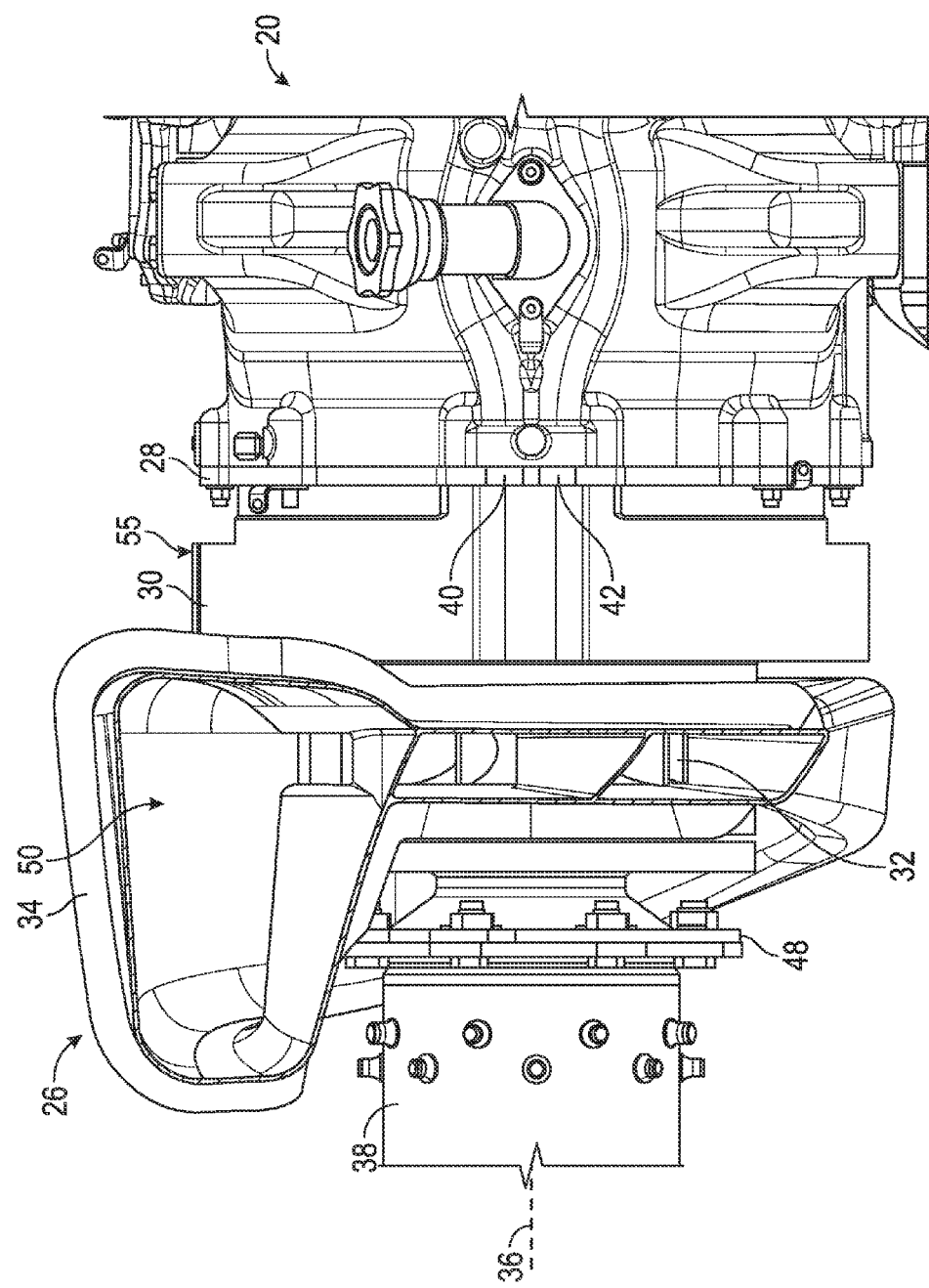
FIG. 3 is a side view of the gearbox oil cooling assembly and a portion of the gearbox.
Figure 4:
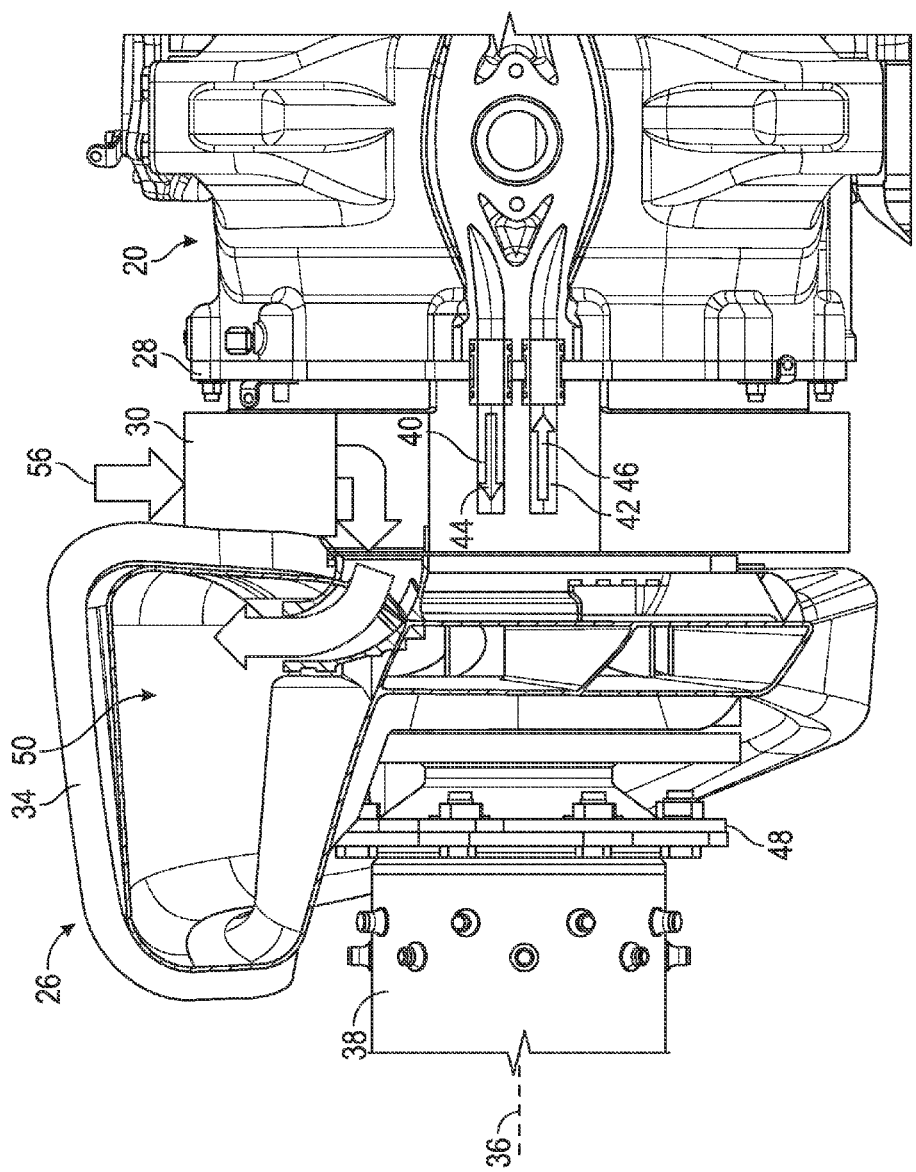
FIG. 4 is a partial cross-sectional side view of the gearbox oil cooling assembly and a portion of the gearbox.
Figure 5:
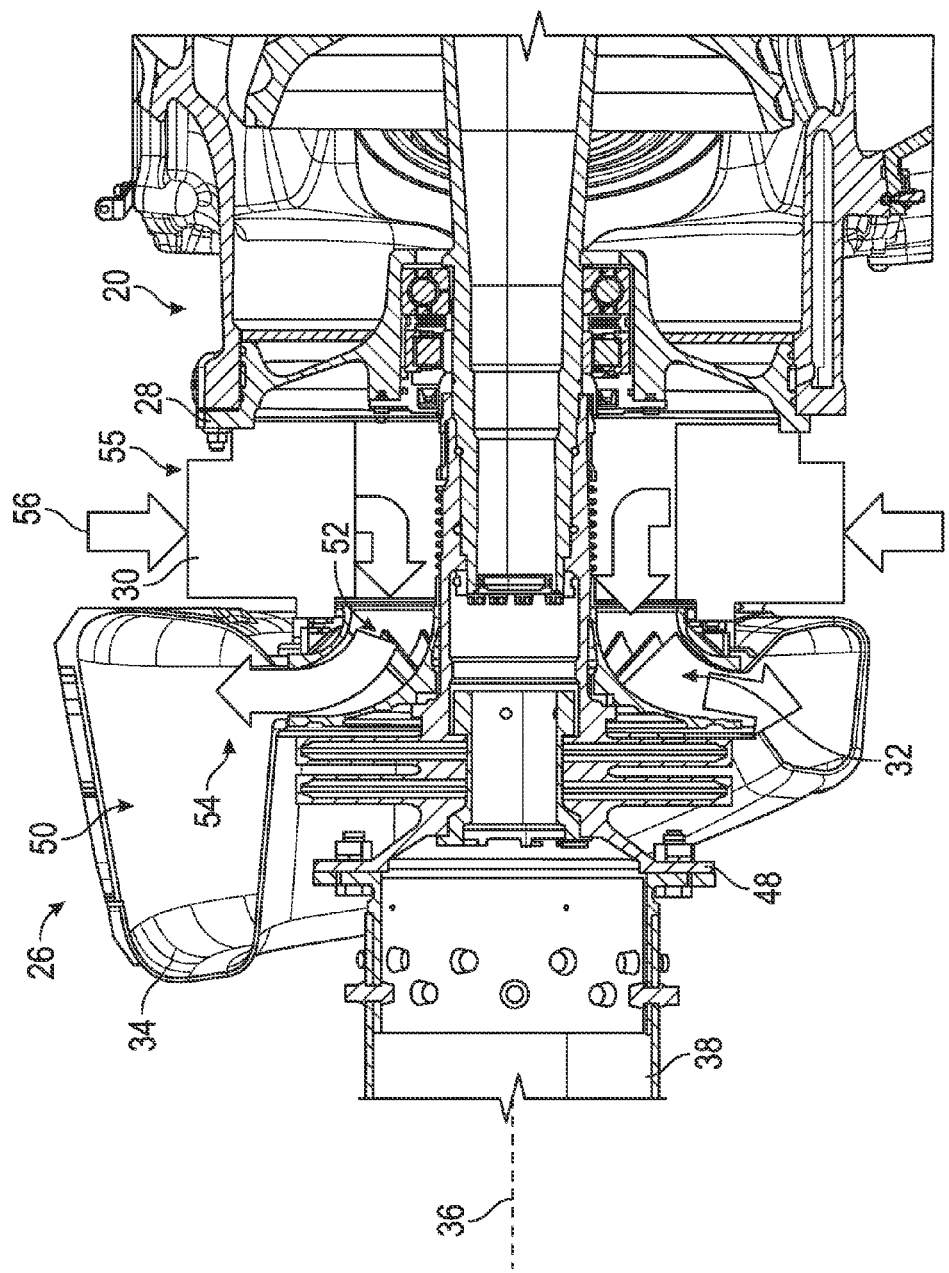
FIG. 5 is a cross-sectional side view of the gearbox oil cooling assembly and a portion of the gearbox.

Referring to FIG. 1, schematically illustrated is a rotary-wing aircraft 10 having a main rotor system 12. The aircraft 10 includes an airframe 14 having an extending tail 16 which mounts a tail rotor system 18, such as an anti-torque system. The main rotor assembly 12 is driven through a main power transmission gearbox (referenced generally with numeral 20) by one or more engines. Although a particular helicopter configuration is illustrated and described in the disclosed embodiment, other configurations and/or machines, such as ground vehicles, maritime engines, industrial transmissions, jet aircraft, turbofan engines, high speed compound rotary wing aircraft with supplemental translational thrust systems, dual contra-rotating, coaxial rotor system aircraft, turboprops, tilt-rotors and tilt-wing aircraft, and such like may also benefit from the embodiments described herein.

The main power transmission gearbox 20 carries torque from the engines through a multitude of gear train paths to a main rotor shaft 22 of the main rotor system 12. The main gearbox 20 is coupled to at least one nose gearbox output shafts to harness the power from the engines, provide further speed reduction and increase output torque. The main gearbox includes gear sets therein for reducing the shaft speed during the transmission of power from the nose gearbox(es) to the output devices. The gearbox 20 is typically located within a housing which may at least partially support the main rotor shaft 22. The embodiments described herein are best illustrated by reference to the illustrated rotary-wing aircraft main power transmission gearbox having highly-loaded torque transmitting gears, bearings and shafts, however, it will be appreciated that the inventive teachings are applicable to any gearbox that utilizes an actively cooled heat exchanger where a compact envelope is required. To cool oil required by the nose gearbox, a gearbox oil cooling assembly is included, the location of which is generally referenced with numeral 26. The gearbox oil cooling assembly 26 will be described more detail below.

Referring now to FIGS. 2-5, various views illustrate the gearbox oil cooling assembly 26, as well as a portion of the nose gearbox that the gearbox oil assembly 26 is employed in conjunction with. The nose gearbox requires the use of oil therein and the oil is heated during operation. Cooling of the oil is required and the gearbox oil cooling assembly 26 is employed to facilitate such cooling, while being configured to have a compact packaging capability, in combination with the nose gearbox.

As shown, the nose gearbox is mounted to, and within, a housing 28 (partially illustrated), a portion of which is in axial abutment with the nose gearbox. The gearbox oil cooling assembly 26 is operatively coupled to the housing 28 portion that is illustrated. The gearbox oil cooling assembly 26 includes a heat exchanger 30 employed to cool the oil of the nose gearbox, an impeller 32, and an exhaust duct 34. The above-noted components of the gearbox oil cooling assembly 26 are disposed in a substantially axially stacked arrangement with each other and with the housing 28, as well as at least a portion of the nose gearbox. As will be appreciated from the description herein, such an axially stacked arrangement facilitates the ability to package the assembly in a compact space. Additionally, the need for belts, pulleys, and related components is eliminated due to the concentric disposition of the components relative to a central axis 36 of a drive shaft 38. The drive shaft 38 extends in an axial direction about the central axis 36.

The heat exchanger 30 is an annular heat exchanger that is situated concentric relative to the drive shaft 38 and is axially disposed between the housing 28 of the nose gearbox and the exhaust duct 34. The heat exchanger 30 is operatively coupled to both the nose gearbox and the exhaust duct 34. In some embodiments, the heat exchanger 30 is directly coupled to the housing 28 of the nose gearbox and to the exhaust duct 34. At least two oil transfer tubes extend between the nose gearbox to the heat exchanger 30 for routing of the oil to the heat exchanger for cooling therein. The oil transfer tubes are located substantially within internal locations of both the gearbox housing 28 and the heat exchanger 30. For example, a first tube 40 is configured to route hot oil 44 from the nose gearbox to the heat exchanger 30 and a second tube 42 is configured to route relatively cooled oil 46 back to the nose gearbox. The first tube 40 and the second tube 42 are oriented in a substantially parallel arrangement relative to each other, as shown, however, one can appreciate that alternative relative orientations may be suitable.

The drive shaft 38 is operatively coupled to a drive shaft coupling 48, which is also coupled to the impeller 32. This arrangement "sandwiches" the impeller 32 between the drive shaft coupling 48 and the heat exchanger 30. As such, rotation of the impeller 32 is directly driven by the drive shaft coupling 48 and the drive shaft 38. Both the impeller 32 and the drive shaft 38 rotate about the central axis 36 of the drive shaft 38. Disposed radially outwardly of the impeller 32 is the exhaust duct 34. The exhaust duct 34 circumferentially surrounds at least a portion of, but typically surrounds the entirety of the impeller 32 circumference.

As noted above, the exhaust duct 34 includes an annular passage 50 that is in fluid communication with an impeller path 52 and a heat exchanger path 54. In combination, the annular passage 50, the impeller path 52 and the heat exchanger path 54 form a single, continuous passage for an airflow 56 to pass through. The airflow 56 is facilitated during operation of the impeller 32, as the airflow 56 is drawn into the heat exchanger path 54 in a radial direction through at least one air inlet 55. The airflow 56 cools the hot oil 44 passing through the first tube 40 via heat transfer. During the process, the airflow 56 is heated as a result of the heat transfer and is routed through the heat exchanger path 54 to the impeller path 52 and into the annular passage of the exhaust duct 34.

Figure 6:
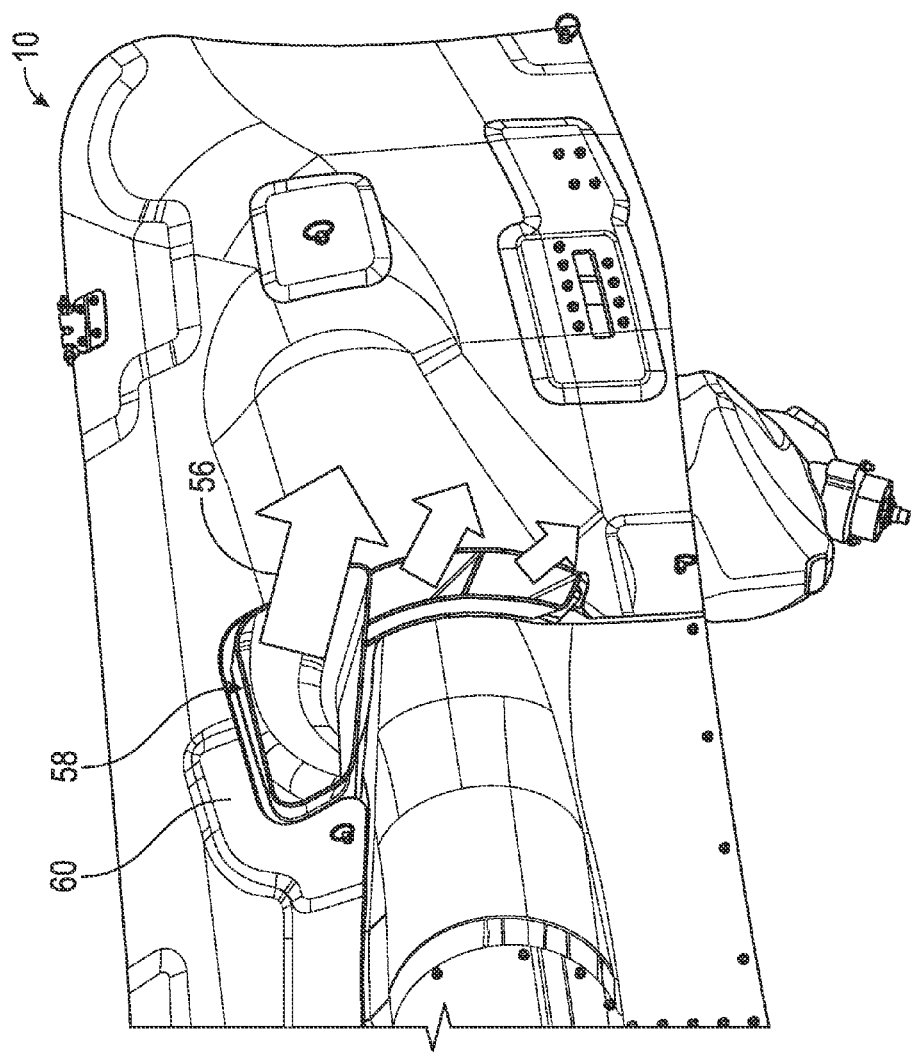
FIG. 6 is a perspective view of an exhaust location of the gearbox oil cooling assembly located proximate an exterior portion of the aircraft.

The exhaust duct 34 includes at least one flow path outlet 58. As shown in FIG. 6, the at least one flow path outlet 58 is oriented such that direct expulsion of the airflow 56 is made to an exterior location of the aircraft 10. In particular, the flow path outlet 58 is positioned to expel the airflow 56 through a fairing 60 of the aircraft 10 to the atmosphere. Advantageously, expulsion to an exterior location reduces heating of the nose gearbox and the oil associated therewith, in comparison to expulsion at an interior location proximate the nose gearbox.

As described in detail above, the components of the gearbox oil cooling assembly 26 are disposed in an axially stacked arrangement and are concentrically located about the central axis 36 of the drive shaft 38. Specifically, the drive shaft coupling 48, the impeller 32, the exhaust duct 34, and the heat exchanger 30 are axially stacked with respect to each other and are concentrically disposed about the central axis 36. Additionally, at least a portion of the nose gearbox, including the housing 28, is disposed in the stacked arrangement and concentrically about the central axis 36. Such an arrangement facilitates compact packaging of the overall assembly and functions within a restrictive envelope situated between the nose gearbox, drive shaft 38, diaphragm coupling and fairings. The direct-drive configuration of the impeller 32 with the drive shaft 38 reduces part count and complexity, thereby increasing its reliability over alternative impeller drive arrangements, including electric arrangements and belt-pulley designs. Furthermore, the use of short, internally disposed oil transfer tubes provides for a more compact, lightweight and reliable system.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A gearbox oil cooling assembly for a gearbox arranged in a helicopter for driving a drive shaft having a drive shaft coupling, the assembly comprising:
   a heat exchanger to receive and cool an oil from the gearbox and having an inlet;
   an impeller axially disposed between the heat exchanger and the drive shaft coupling, wherein the impeller is operatively coupled to, and rotated by, the drive shaft operatively coupled to the drive shaft coupling; and
   an exhaust duct operatively coupled to the heat exchanger and disposed radially outwardly around the impeller and defining an airflow pathway through which air passes through the inlet, the impeller and through the exhaust duct according to the rotation of the impeller to cool the oil in the heat exchanger, wherein the exhaust duct includes a flow path outlet positioned proximate a surface of the helicopter and configured to directly exhaust an airflow to the atmosphere.

2. The gearbox oil cooling assembly of claim 1, wherein the drive shaft and the impeller are rotated about a central axis, wherein the heat exchanger is concentrically oriented about the central axis.

3. The gearbox oil cooling assembly of claim 1, wherein the oil is routed to the heat exchanger within a first tube and the oil is returned to the gearbox within a second tube.

4. The gearbox oil cooling assembly of claim 3, wherein the first tube and the second tube are disposed at an internal location relative to the gearbox and the heat exchanger.

5. The gearbox oil cooling assembly of claim 1, further comprising a gearbox housing, wherein the heat exchanger is directly coupled to the gearbox housing.

6. The gearbox oil cooling assembly of claim 1, wherein the exhaust duct is directly coupled to the heat exchanger.

7. The gearbox oil cooling assembly of claim 1, wherein the exhaust duct circumferentially surrounds the impeller.

8. The gearbox oil cooling assembly of claim 1, wherein the flow path outlet of the exhaust duct is positioned proximate a fairing of the helicopter.

9. The gearbox oil cooling assembly of claim 1, wherein the impeller, the heat exchanger, and the exhaust duct are concentrically positioned about the drive shaft.

10. The gearbox oil cooling assembly of claim 1, wherein a portion of the gearbox is concentrically positioned about a central axis of the drive shaft.

11. The gearbox oil cooling assembly of claim 1, wherein the heat exchanger includes at least one air inlet configured to receive an airflow in a radial direction, wherein the airflow is routed axially through the heat exchanger to the exhaust duct.

12. The gearbox oil cooling assembly of claim 1, wherein at least a portion of each of the drive shaft coupling, the impeller, the exhaust duct, the heat exchanger and the gearbox are disposed in an axially stacked arrangement.

13. A gearbox oil cooling assembly for a gearbox driving a drive shaft having a drive shaft coupling, the assembly comprising:
   a heat exchanger operatively coupled to the gearbox;
   a plurality of tubes disposed at an internal location relative to the gearbox and the heat exchanger, the plurality of tubes comprising a first tube configured to route an oil to the heat exchanger for cooling therein and a second tube configured to return the oil to the gearbox;
   an impeller axially disposed between the heat exchanger and the drive shaft coupling, wherein the impeller is operatively coupled to, and rotated by, the drive shaft operatively coupled to the drive shaft coupling; and
   an exhaust duct operatively coupled to the heat exchanger and disposed radially outwardly around the impeller, wherein the impeller, the heat exchanger, and the exhaust duct are concentrically positioned about a central axis of the drive shaft, wherein at least a portion of each of the drive shaft coupling, the impeller, the exhaust duct, the heat exchanger, and the gearbox are disposed in an axially stacked arrangement, wherein the exhaust duct defines an airflow pathway through which air passes through an inlet, the impeller and through the exhaust duct according to the rotation of the impeller to cool the oil in the heat exchanger and includes a flow path outlet positioned proximate a surface of the helicopter and configured to directly exhaust an airflow to the atmosphere.

14. The gearbox oil cooling assembly of claim 13, wherein the drive shaft and the impeller are rotated about the central axis, wherein the heat exchanger is oriented about the central axis.

15. The gearbox oil cooling assembly of claim 13, wherein the gearbox oil cooling assembly is disposed on a helicopter and the flow path outlet of the exhaust duct is positioned proximate a fairing of the helicopter.

16. A gearbox oil cooling assembly for a gearbox driving a drive shaft having a drive shaft coupling, the assembly comprising:
   a heat exchanger to receive and cool and oil from the gearbox and having an inlet;
   an impeller axially disposed between the heat exchanger and the drive shaft coupling, wherein the impeller is operatively coupled to, and rotated by, the drive shaft operatively coupled to the drive shaft coupling; and
   an exhaust duct operatively coupled to the heat exchanger and disposed radially outwardly around the impeller and defining an airflow pathway through which air passes through the inlet, the impeller and through the exhaust duct according to the rotation of the impeller to cool the oil in the heat exchanger.
   a first tube and a second tube, wherein the oil is routed to the heat exchanger within the first tube and the oil is returned to the gearbox within the second tube,
   wherein the drive shaft coupling, the impeller, the exhaust duct, the heat exchanger, and the gearbox are disposed in an axially stacked arrangement,
   wherein the first tube and the second tube are disposed at an internal location relative to the gearbox and the heat exchanger; and
   wherein the exhaust duct includes a flow path outlet positioned proximate a surface of the helicopter and configured to directly exhaust an airflow to the atmosphere.

17. A helicopter including an airframe, at least one engine, and a rotor system operatively connected to the at least one engine through the gearbox having the gearbox oil cooling assembly of claim 1.

18. A helicopter including an airframe, at least one engine, and a rotor system operatively connected to the at least one engine through the gearbox having the gearbox oil cooling assembly of claim 13.

19. A helicopter including an airframe, at least one engine, and a rotor system operatively connected to the at least one engine through the gearbox having the gearbox oil cooling assembly of claim 16.

20. The gearbox oil cooling assembly of claim 1, wherein the drive shaft is connected to an output of the gearbox.

* * * * *